US008402346B2

(12) United States Patent  
Goel et al.

(10) Patent No.: US 8,402,346 B2  
(45) Date of Patent: *Mar. 19, 2013

(54) N-WAY PARITY TECHNIQUE FOR ENABLING RECOVERY FROM UP TO N STORAGE DEVICE FAILURES

(75) Inventors: Atul Goel, Foster City, CA (US); Peter F. Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 776 days.

This patent is subject to a terminal disclaimer.

(21) Appl. No.: 12/536,063

(22) Filed: Sep. 25, 2009

(65) Prior Publication Data

US 2011/0010599 A1    Jan. 13, 2011

Related U.S. Application Data

(63) Continuation-in-part of application No. 11/304,369, filed on Dec. 15, 2005, now Pat. No. 7,640,484, which is a continuation-in-part of application No. 10/035,607, filed on Dec. 28, 2001, now Pat. No. 6,993,701.

(51) Int. Cl.  
*G11C 29/00* (2006.01)

(52) U.S. Cl. .......... 714/770; 714/6.12; 711/114

(58) Field of Classification Search .......... 714/6.12, 714/770; 711/114  
See application file for complete search history.

(56) References Cited

U.S. PATENT DOCUMENTS

| 3,876,978 | A | 4/1975 | Bossen et al. |
|---|---|---|---|
| 4,092,732 | A | 5/1978 | Ouchi |
| 4,201,976 | A | 5/1980 | Patel |
| 4,205,324 | A | 5/1980 | Patel |
| 4,375,100 | A | 2/1983 | Tsuji et al. |
| 4,435,807 | A | 3/1984 | Scott et al. |
| 4,467,421 | A | 8/1984 | White |
| 4,517,663 | A | 5/1985 | Imazeki et al. |
| 4,547,882 | A | 10/1985 | Tanner |
| 4,667,326 | A | 5/1987 | Young et al. |
| 4,688,221 | A | 8/1987 | Nakamura et al. |
| 4,722,085 | A | 1/1988 | Flora et al. |
| 4,755,978 | A | 7/1988 | Takizawa et al. |
| 4,761,785 | A | 8/1988 | Clark et al. |
| 4,775,978 | A | 10/1988 | Hartness |
| 4,796,260 | A | 1/1989 | Schilling et al. |
| 4,817,035 | A | 3/1989 | Timsit |

(Continued)

FOREIGN PATENT DOCUMENTS

| EP | 1132914 | 12/2001 |
|---|---|---|
| EP | 1 324 200 A2 | 7/2003 |

(Continued)

OTHER PUBLICATIONS

Anvin, Peter H, "*The Mathematics of RAID 6*," Dec. 2004.

(Continued)

*Primary Examiner* — Esaw Abraham  
(74) *Attorney, Agent, or Firm* — Cesari and McKenna, LLP

(57) ABSTRACT

An n-way parity protection technique enables recovery of up to n storage device (e.g., disk) failures in a parity group of a storage array encoded to protect against n-way disk failures. The storage array is created by first configuring the array with m data disks, where m=p−1 and p is a prime number and a row parity disk. n−1 diagonal parity disks are then added to the array. Each diagonal parity set (i.e., diagonal) is associated with a slope that defines the data and row parity blocks of the array that are included in the diagonal. All diagonals having a common slope within a parity group are organized as a diagonal parity class. For each diagonal parity class, a diagonal parity storage disk is provided to store the diagonal parity.

25 Claims, 5 Drawing Sheets

U.S. PATENT DOCUMENTS

| | | | |
|---|---|---|---|
| 4,825,403 | A | 4/1989 | Gershenson et al. |
| 4,837,680 | A | 6/1989 | Crockett et al. |
| 4,847,842 | A | 7/1989 | Schilling |
| 4,849,929 | A | 7/1989 | Timsit |
| 4,849,974 | A | 7/1989 | Schilling et al. |
| 4,849,976 | A | 7/1989 | Schilling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,271,012 | A | 12/1993 | Blaum et al. |
| 5,274,799 | A | 12/1993 | Brant et al. |
| 5,305,326 | A | 4/1994 | Solomon et al. |
| 5,351,246 | A | 9/1994 | Blaum et al. |
| 5,375,128 | A | 12/1994 | Menon et al. |
| 5,410,667 | A | 4/1995 | Belsan et al. |
| 5,513,192 | A | 4/1996 | Janku et al. |
| 5,537,567 | A * | 7/1996 | Galbraith et al. ............ 711/114 |
| 5,574,851 | A | 11/1996 | Rathunde |
| 5,579,475 | A | 11/1996 | Blaum et al. |
| 5,623,595 | A | 4/1997 | Bailey |
| 5,657,468 | A | 8/1997 | Stallmo et al. |
| 5,774,643 | A | 6/1998 | Lubbers et al. |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,948,110 | A * | 9/1999 | Hitz et al. .................... 714/6.22 |
| 5,950,225 | A | 9/1999 | Kleiman |
| 5,963,962 | A | 10/1999 | Hitz et al. |
| 6,038,570 | A | 3/2000 | Hitz et al. |
| 6,041,423 | A | 3/2000 | Tsukerman |
| 6,092,215 | A | 7/2000 | Hodges et al. |
| 6,138,125 | A | 10/2000 | DeMoss |
| 6,138,126 | A | 10/2000 | Hitz et al. |
| 6,138,201 | A | 10/2000 | Rebalski |
| 6,158,017 | A * | 12/2000 | Han et al. ..................... 714/6.24 |
| 6,198,413 | B1 | 3/2001 | Widmer |
| 6,223,300 | B1 | 4/2001 | Gotoh |
| 6,223,323 | B1 | 4/2001 | Wescott |
| 6,247,157 | B1 * | 6/2001 | Edirisooriya ................. 714/767 |
| 6,275,410 | B1 | 8/2001 | Morford |
| 6,279,117 | B1 | 8/2001 | Takeda |
| 6,289,356 | B1 | 9/2001 | Hitz et al. |
| 6,353,895 | B1 * | 3/2002 | Stephenson .................. 714/5.11 |
| 6,453,428 | B1 * | 9/2002 | Stephenson .................. 714/6.21 |
| 6,532,548 | B1 | 3/2003 | Hughes |
| 6,557,123 | B1 | 4/2003 | Wiencko et al. |
| 6,571,326 | B2 | 5/2003 | Spiegel et al. |
| 6,581,185 | B1 | 6/2003 | Hughes |
| 6,671,772 | B1 | 12/2003 | Cousins |
| 6,694,479 | B1 * | 2/2004 | Murthy et al. ................ 714/805 |
| 6,725,392 | B1 * | 4/2004 | Frey et al. .................... 714/6.12 |
| 6,742,137 | B1 | 5/2004 | Frey, Jr. |
| 6,779,095 | B2 | 8/2004 | Selkirk et al. |
| 6,826,580 | B2 | 11/2004 | Harris et al. |
| 6,826,661 | B2 | 11/2004 | Umbehocker et al. |
| 6,832,291 | B2 * | 12/2004 | Lee ............................... 711/114 |
| 6,851,082 | B1 | 2/2005 | Corbett |
| 6,871,317 | B1 * | 3/2005 | Corbett ......................... 714/800 |
| 6,993,701 | B2 | 1/2006 | Corbett et al. |
| 7,073,115 | B2 | 7/2006 | English et al. |
| 7,203,892 | B2 | 4/2007 | Corbett et al. |
| 7,328,305 | B2 | 2/2008 | Kleiman et al. |
| 7,409,625 | B2 | 8/2008 | Corbett et al. |
| 2002/0083037 | A1 | 6/2002 | Lewis et al. |
| 2002/0124137 | A1 | 9/2002 | Ulrich et al. |
| 2004/0030668 | A1 | 2/2004 | Pawlowski et al. |
| 2006/0129873 | A1 | 6/2006 | Hafner |
| 2007/0089045 | A1 | 4/2007 | Corbett et al. |
| 2008/0016435 | A1 | 1/2008 | Goel |

FOREIGN PATENT DOCUMENTS

| | | |
|---|---|---|
| EP | 02 25 8872 | 5/2006 |
| GB | 2011138 | 2/1982 |
| WO | WO 96/34463 | 10/1996 |
| WO | WO 99/59157 | 11/1999 |
| WO | WO-01/13236 A1 | 2/2001 |
| WO | WO-02/29539 A2 | 4/2002 |
| WO | WO2007/078803 A2 | 7/2007 |
| WO | WO2007/078803 A3 | 7/2007 |
| WO | WO2008/082584 A2 | 7/2008 |
| WO | WO2008/082584 A3 | 7/2008 |

OTHER PUBLICATIONS

Auspex 4Front NS2000, System Architecture, Network-Attached Storage for a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Shadowing*, Proceedings of the $14^{th}$ VLDB Conference, LA, CA (1988).

Blaum, Mario, et al., *Evenodd: An Optimal Scheme for Tolerating Double Disk Failures in RAID Architectures*, Computer Architectures News, Association for Computing Machinery, New York, US, vol. 22, No. XP000450355, Apr. 1, 1994.

Blaum, Mario, et al., *Evenodd: An Efficient Scheme for Tolerating Double Disk Failures in RAID Architectures*, IEEE Transactions on Computers, vol. 44, No. 2, Feb. 1995, pp. 192-202.

Bultman, David L., *High Performance SCSI Using Parallel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same copy as one in WAFL.

Chen, Peter M.., et al, *Maximizing Performance in a Striped Disk Array*, Proc. 1990 ACM SIGARCH 17th Intern. Symp. on Comp. Arch., Seattle, WA, May 1990, pp. 322-331.

Chen, Peter M., et al., *RAID: High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., *A Comparison of High-Availability Media Recovery techniques*, in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part I*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1988.).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hitz, David, *File System Design for a NFS File Server Appliance*, Technical Report 3002, Rev. C395, Network Appliance, Inc., Jan. 19, 1994, 23 pages.

Hughes, James, et al., *High Performance RAIT*, Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, EECS Department, University of California, Berkeley, Technical Report No. UCB/CSD-89-497, Mar. 1989, 17 pages.

Kent, Jack et al., *Optimizing Shadow Recovery Algorithms*, IEEE Transactions on Software Engineering, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Lee, Edward K., et al., *The Performance of Parity Placements in Disk Arrays*, IEEE Transactions on Computers, vol. 42 No. 6, Jun. 1993, 14 pages.

Li, Don, et al., *Authors' Reply*, IEEE Transactions on Communications, 46:575, May 1998.

*Limited Distributed DASD Checksum, A RADI Hybrid*, IBW Technical Disclosure Bulletin, IBM Corp. New York, US vol. 35. No. 4A, XP000314813, Sep. 1, 1992.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Menon, Jai, et al., *Methods for Improved Update Performance of Disk Arrays*, IBM Almaden Research Center, IEEE, Jan. 1992, 10 pages.

Menon, Jai, et al., *Floating Parity and Data Disk Arrays*, Journal of Parallel and Distributed Computing, Boston: Academic Press. Inc., vol. 17 No. 1 and 2, Jan./Feb. 1993, 13 pages.

Microsoft Computer Dictionary, $5^{th}$ Edition, 2002, p. 211.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance in Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

Storagesuite, *Performance Without Compromise: The Virtual Storage Architecture*, catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Scheuermann, Peter, et al., *Data Partitioning and Load Balancing in Parallel Disk Systems*, The VLDB Journal, vol. 7, Springer-Verlag, Copyright Feb. 1998, 19 pages.

Schulze, Martin E., *Considerations in the Design of a RAID Prototype*, Computer Science Division, Department of Electrical Engineering and Computer Sciences, Univ. of CA, Berkeley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stanek, William R., *Microsoft Windows 2000 Server: Administering Volume Sets and RAID Arrays*, Jan. 10, 2006, (http://www.microsoft.com/technet/prodtechnol/windows2000serv/maintain/operate/11w2kada.mspx), (Printed 1999).

Stodolsky, Daniel, et al., *Parity Logging Overcoming the Small Write Problem in Redundant Disk Array*, School of Computer Science and Department of Electrical and Computer Engineering, Carnegie Mellon University, IEEE, May 1993, 12 pages.

Stonebraker, Michael, et al., *The Design of XPRS*, Proceedings of the $14^{th}$ VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

TEKRAM—"About RAID 6", Aug. 2004, 3 pages.

Tweten, David, *Hiding Mass Storage Under UNIX: NASA's MSS-H Architecture*, IEEE Symposium on Mass Storage, pp. 140-145, May 1990.

Weikum, Gerhard, et al., *Dynamic File Allocation in Disk Arrays*, ETH Zurich, Department of Computer Science Information Systems—Databases, ACM SIGMOD Record, vol. 20, Issue 2, Jun. 1991, 10 pages.

Wilkes, John, et al., *The HP AutoRAID hierarchical storage system*, ACM Transactions on Computer Systems, Feb. 1996, vol. 14, pp. 108-136.

Huang, Cheng "Efficient and Effective Schemes for Streaming Media Delivery," Washington University: Server Institute of Technology, Department of Computer Science, Aug. 2005, p. 1-104.

PCT Notification of Transmittal of the International Search Report and the Written Opinion of the International Searching Authority, or the Declaration, International Application No. PCT/US2006/047647, International Filing Date: Dec. 14, 2006: Date of Mailing: Mar. 3, 2009, 15 pages.

Chin-Shing Tau et al. "Efficient Parity Placement Schemes for Tolerating Triple Disk Failures in RAID Architectures" Proc. $17^{th}$ Int Conf on Advanced Information Networking and Applications. Mar. 27, 2003; 6 pages.

Mario Blaum "A Family of MDS Array Codes with Minimal Number of Encoding Operations" Information Theory, 2006 IEEE International Symposium on, IEEE, PI; Jul. 1, 2006, pp. 2784-2788.].

Huysing-Solles, H., PCT Notification of Transmittal of the International Search Report and the Written Opinion of the International Searching Authority, or the Declaration, International Appl. No. PCT/US2010/002600, filed Sep. 23, 2010, document dated Feb. 16, 2011, 10 pages, European Patent Office, Rijswijk, Netherlands.

Patterson, D., et al., *A Case for Redundant Arrays of Inexpensive Disks (RAID)*, SIGMOD International Conference on Management of Data, Chicago, IL, USA, Jun. 1-3, 1988, Sigmod Record (17)3:109-16 (Sep. 1988).

\* cited by examiner

| DATA | DATA | DATA | DATA | DATA | DATA | ROW PARITY |
|---|---|---|---|---|---|---|
| 0 | 5 | 3 | 1 | 6 | 4 | 2 |
| 1 | 6 | 4 | 2 | 0 | 5 | 3 |
| 2 | 0 | 5 | 3 | 1 | 6 | 4 |
| 3 | 1 | 6 | 4 | 2 | 0 | 5 |
| 4 | 2 | 0 | 5 | 3 | 1 | 6 |
| 5 | 3 | 1 | 6 | 4 | 2 | 0 |
| 6 | 4 | 2 | 0 | 5 | 3 | 1 |

FIG. 4

| 0 | 3 | 6 | 2 | 5 | 1 | 4 |
|---|---|---|---|---|---|---|
| 1 | 4 | 0 | 3 | 6 | 2 | 5 |
| 2 | 5 | 1 | 4 | 0 | 3 | 6 |
| 3 | 6 | 2 | 5 | 1 | 4 | 0 |
| 4 | 0 | 3 | 6 | 2 | 5 | 1 |
| 5 | 1 | 4 | 0 | 3 | 6 | 2 |
| 6 | 2 | 5 | 1 | 4 | 0 | 3 |

FIG. 5

N-WAY PARITY TECHNIQUE FOR ENABLING RECOVERY FROM UP TO N STORAGE DEVICE FAILURES

CROSS-REFERENCE TO RELATED APPLICATIONS

The present application is a continuation-in-part of U.S. patent Ser. No. 11/304,369 now U.S. Pat. No. 7,640,484, which was filed Dec. 15, 2005, and issued on Dec. 29, 2009, entitled TRIPLE PARITY TECHNIQUE FOR ENABLING EFFICIENT RECOVERY FROM TRIPLE FAILURES IN A STORAGE ARRAY, by Peter F. Corbett, et al., which is a continuation-in-part of U.S. patent application Ser. No. 10/035,607, which was filed on Dec. 28, 2001, now issued as U.S. Pat. No. 6,993,701 on Jan. 31, 2006, by Peter F. Corbett for a ROW-DIAGONAL PARITY TECHNIQUE FOR ENABLING EFFICIENT RECOVERY FROM DOUBLE FAILURES IN A STORAGE ARRAY, the teachings of both applications are hereby incorporated by reference.

FIELD OF THE INVENTION

The present invention relates to storage systems and, more specifically, to a technique for encoding parity data to enable recovery from a plurality of failed storage devices of a storage array.

BACKGROUND OF THE INVENTION

A storage system typically comprises one or more storage devices into which data may be entered, and from which data may be obtained, as desired. The storage system may be implemented in accordance with a variety of storage architectures including, but not limited to, a network-attached storage environment, a storage area network and a disk assembly directly attached to a client or host computer. The storage devices are typically disk drives, wherein the term "disk" commonly describes a self-contained rotating magnetic media storage device. The term "disk" in this context is synonymous with hard disk drive (HDD) or direct access storage device (DASD).

The disks within a storage system are typically organized as one or more groups, wherein each group is operated as a Redundant Array of Independent (or Inexpensive) Disks (RAID). Most RAID implementations enhance the reliability/integrity of data storage through the redundant writing of data stripes across a given number of physical disks in the RAID group, and the appropriate storing of redundant information with respect to the striped data. The redundant information enables recovery of data lost when a storage device fails.

In the operation of a disk array, it is anticipated that a disk can fail. A goal of a high performance storage system is to make the mean time to data loss (MTTDL) as long as possible, preferably much longer than the expected service life of the system. Data can be lost when one or more disks fail, making it impossible to recover data from the device. Typical schemes to avoid loss of data include mirroring, backup and parity protection. Mirroring is an expensive solution in terms of consumption of storage resources, such as disks. Backup does not protect data modified since the backup was created. Parity schemes are common because they provide a redundant encoding of the data that allows for a single erasure (loss of one disk) with the addition of just one disk drive to the system.

Parity protection is used in computer systems to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block are blocks containing data ("data blocks") and one block is a block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988, the contents of which are hereby incorporated by reference.

As used herein, the term "encoding" means the computation of a redundancy value over a predetermined subset of data blocks, whereas the term "decoding" means the reconstruction of a data or parity block by using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

Parity schemes generally provide protection against a single disk failure within a parity group. These schemes can also protect against multiple disk failures as long as each failure occurs within a different parity group. However, if two disks fail concurrently within a parity group, then an unrecoverable loss of data is suffered. Failure of two disks concurrently within a parity group is a fairly common occurrence, particularly because disks "wear out" and because of environmental factors with respect to the operation of the disks. In this context, the failure of two disks concurrently within a parity group is referred to as a "double failure".

A double failure typically arises as a result of a failure of one disk and a subsequent failure of another disk while attempting to recover from the first failure. The recovery or reconstruction time is dependent upon the level of activity of the storage system. That is, during reconstruction of a failed disk, it is possible that the storage system remain "online" and continue to serve requests (from clients or users) to access (i.e., read and/or write) data. If the storage system is busy serving requests, the elapsed time for reconstruction increases. The reconstruction process time also increases as the size and number of disks in the storage system increases, as all of the surviving disks must be read to reconstruct the lost data. Moreover, the double disk failure rate is proportional to the square of the number of disks in a parity group. However, having small parity groups is expensive, as each parity group requires an entire disk devoted to redundant data.

Another failure mode of disks is media read errors, wherein a single block or sector of a disk cannot be read. The unreadable data can be reconstructed if parity is maintained in the storage array. However, if one disk has already failed, then a media read error on another disk in the array will result in lost data. This is a second form of double failure.

In certain storage environments, it is common to utilize a significant number of lower quality disk drives, such as, e.g., near line storage systems for use as short term storage before data is backed up to tape or other long-term archival systems. However, as the number of disks in an array increases, the probability that multiple failures will occur also increases. The probability is exacerbated by a lower mean time to failure (MTTF) of less expensive storage devices. Thus, it is possible to have storage systems experiencing triple or greater failures, that is, the concurrent failures of three or more devices in the storage array. Furthermore, numerous storage protocols, such as Serial Attached SCSI (SAS), Fibre Channel (FC), etc., have resulted in increasingly complex architectures for disk shelves, which has resulted in a concomitant increase in the number of failures experienced by such shelves and which, in turn, results in loss of access to each disk connected to a failed disk shelf.

More generally, there is needed a generalized erasure code that is efficient and may be utilized for n-way failures in a parity group, i.e., failure of up to n storage devices in an array. Such additional protection against n-way failures may be necessary to ensure compliance with regulated industries, long term archival storage, disaster recovery, etc.

SUMMARY OF THE INVENTION

The present invention overcomes the disadvantages of the prior art by providing an n-way parity protection technique that enables recovery of up to n storage device (e.g., disk) failures in a parity group of a storage array encoded to protect against n-way disk failures. The array is configured so that, in the event of failures of storage devices of the array, the contents of the array may be reconstructed using any technique for solving systems of linear equations, e.g., using matrix mathematics, etc. The storage array is created by first configuring the array with m data disks, where m=p−1 and p is a prime number, i.e., a number only divisible by 1 and itself. Row parity may be stored on a dedicated row parity disk, e.g., in a manner similar to RAID 4, or may be stored and rotated among the data disks, e.g., in a manner similar to RAID 5.

n−1 diagonal parity disks are then added to the array to provide a total of n bits of parity, i.e., 1 row parity bit and n−1 diagonal parity bits. Each diagonal parity set (i.e., diagonal) is associated with a slope that defines the data and row parity blocks of the array that are included in the diagonal. That is, all data and row parity blocks that lay on the same slope through the array are associated with a diagonal. All diagonals having a common slope within a parity group are organized as a diagonal parity class. For each diagonal parity class, a diagonal parity storage disk is provided to store the diagonal parity. The number of added diagonal parity disks may be set by a system administrator to achieve a desired level of protection provided that the maximum number of diagonal parity classes is limited to p−1. In other words, in accordance with an illustrative embodiment described herein, $n \leq p$ because the number of n−1 diagonal parity classes cannot exceed p−1 to ensure that the resulting system of equations is solvable. Once added to the array, each diagonal parity disk is divided into blocks, and the blocks of the data disks and, if applicable, the row parity disk are organized into stripes. The row parity is then computed by XORing data blocks of a row parity set (i.e., row) and the computed parity is then stored in row parity blocks on the row parity disk or the appropriate data disk.

All data and row parity blocks are then assigned to diagonals of the n−1 diagonal parity classes. One of the diagonal parity classes is selected and the diagonal parity for each diagonal of the class, i.e., diagonals having a common (identical) slope, is computed. The computed diagonal parity is then stored on the appropriate diagonal parity disk. If there are additional diagonal parity classes, the process repeats for each additional class.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 4 is a schematic block diagram of a disk array showing parity stripes in accordance with an illustrative embodiment of the present invention;

FIG. 5 is a schematic block diagram of a disk array showing parity stripes in accordance with an illustrative embodiment of the present invention.

DETAILED DESCRIPTION OF THE ILLUSTRATIVE EMBODIMENTS

A. Storage System Environment

Figure 1:
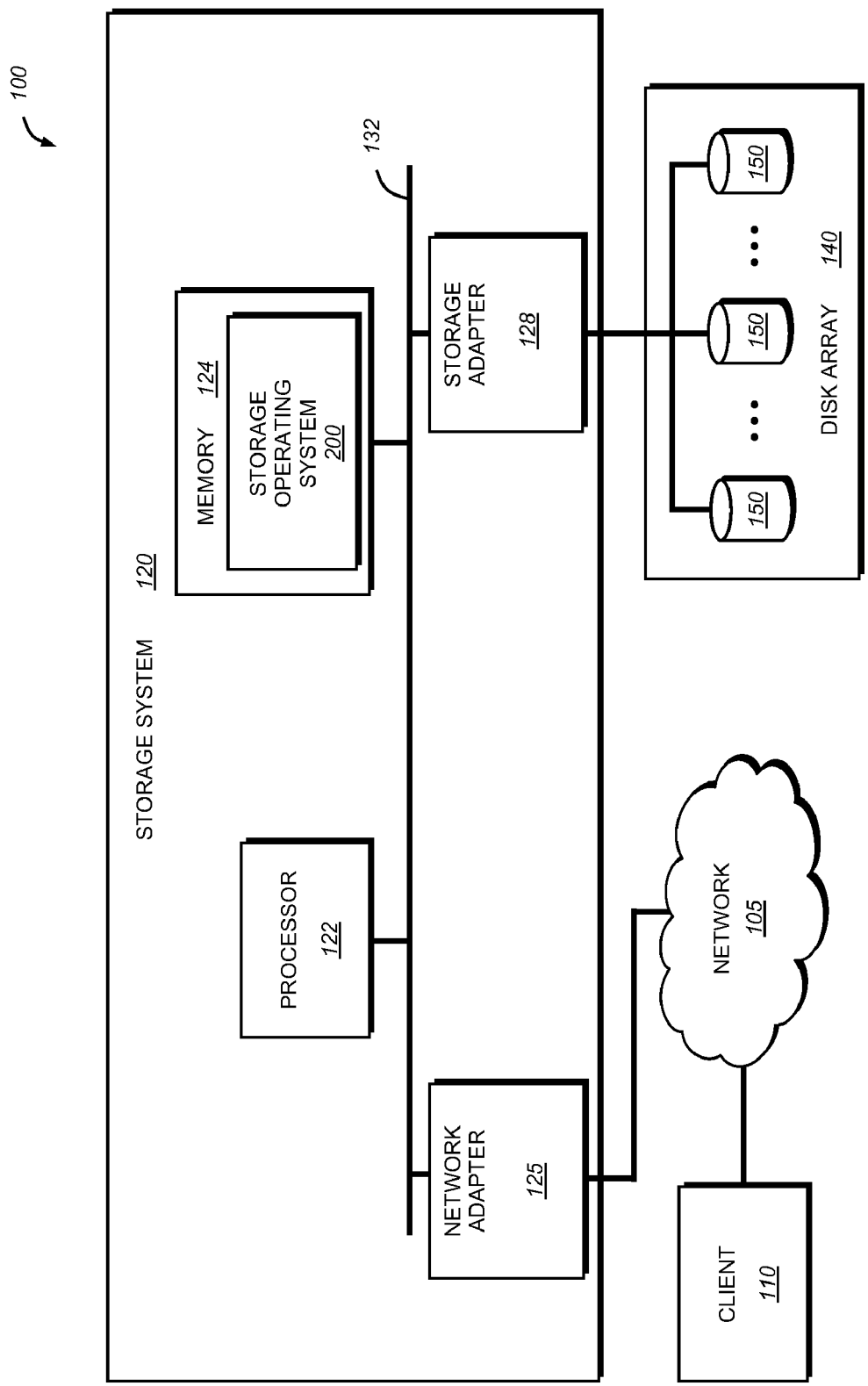
FIG. 1 is a schematic block diagram of an environment including a storage system in accordance with an illustrative embodiment of the present invention.

FIG. 1 is a schematic block diagram of an environment 100 including a storage system 120 that may be advantageously in accordance with an illustrative embodiment of the present invention. The inventive technique described herein may apply to any type of special-purpose (e.g., file server or filer) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

In the illustrative embodiment, the storage system 120 comprises a processor 122, a memory 124, a network adapter 125 and a storage adapter 128 interconnected by a system bus 132. The memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 125 comprises a plurality of ports adapted to couple the storage system 120 to one or more clients 110 over point-to-point links, wide area networks, virtual private networks implemented over a public network (Internet) or a shared local area network. The network adapter 125 thus may comprise the mechanical, electrical and signaling circuitry needed to connect the node to the network. Illustratively, the network 105 may be embodied as an Ethernet network or a Fibre Channel (FC) network. Each client 110 may communicate with the storage system 120 over network 105 by exchanging discrete frames or packets of data according to pre-defined protocols, such as TCP/IP.

The storage adapter 128 cooperates with the storage operating system 200 executing on the system 120 to access information requested by a user (or client). The information may be stored on any type of attached array of writeable storage device media such as video tape, optical, DVD, magnetic tape, bubble memory, electronic random access memory, micro-electro mechanical, flash or other solid state media and/or any other similar media adapted to store information, including data and parity information. However, as illustratively described herein, the information is stored on disks 150, such as HDD and/or DASD, of array 140. The storage adapter includes input/output (I/O) interface circuitry that couples to the disks over an I/O interconnect arrangement, such as a conventional high-performance, FC serial link topology.

Storage of information on array 140 is preferably implemented as one or more storage "volumes" that comprise a cluster of physical storage disks 150, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

The present invention comprises an n-way parity (nP) technique that provides multiple storage device failure recovery using row parity, and a plurality of diagonal parity in a disk array. The inventive technique is preferably implemented by a disk storage module (shown at 240 of FIG. 2) of the storage operating system 200 to provide a method and system for constructing parity in stripes across multiple storage devices, such as disks, in a storage system. The invention reduces the amount of computation of parity information that is required compared to previously known schemes, while also reducing the computation to recover from a plurality of disk failures. In addition, the invention provides a uniform stripe depth (each disk contains the same number of blocks per stripe) and an amount of parity information equal to n disks worth, which is the minimum amount required to allow reconstruction from any n disk failures.

Broadly stated, the invention comprises m+n storage devices, where $m=p-1$ and p is a prime number and n is the number of failures that can be recovered from. Parity is generally calculated as an exclusive-OR (XOR) of data blocks to form a parity block. The XOR operation is generally performed over the same 1-bit field in each input block to produce a single corresponding bit of output. As noted, the XOR operation is equivalent to two's complement addition or subtraction of two 1-bit fields. Redundant parity information may also be computed as the sum of same-sized multi-bit fields (e.g., 8, 16, 32, 64, 128 bits) in all the inputs. For example, the equivalent of parity may be computed by adding data using two's complement addition on 32-bit fields to produce each 32 bits of redundant information. This is only the case assuming non-reliance on the fact that an XOR operation directed to the same input twice into a block produces the original content of the block, as the XOR of a block with itself produces zero.

It will be apparent to those skilled in the art that a block (for purposes of parity computation) may or may not correspond to a file block, a database block, a disk sector or any other conveniently sized unit. There is no requirement that the block size used for parity computation have any relation to any other block sizes used in the system. However, it is expected that one or more integer number of parity blocks will fit into a unit defined to be one or more integer number of disk sectors. In many cases, some number of blocks will correspond to file system or database blocks, and will typically be of size 4 k (4096) bytes or some higher power of two bytes (e.g., 8 k, 16 k, 32 k, 64 k, 128 k, 256 k).

The illustrative system described herein illustratively performs full stripe write operations. In particular, individual file blocks that are typically 4 k or 8 k bytes may be divided into smaller blocks used only for parity computation, so that full stripes of, e.g., 4 k byte sized blocks can be written to the disks of the array. When full stripes are written to disk, all parity computations may be performed in memory before the results are written to disk, thus reducing the burden of computing and updating parity on disk.

B. Storage Operating System

To facilitate access to the disks, the storage operating system 200 implements a write-anywhere file system that cooperates with virtualization modules to provide a function that "virtualizes" the storage space provided by disks. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN system approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP® operating system available from NetApp, Inc., Sunnyvale, Calif. that implements a Write Anywhere File Layout (WAFL®) file system. However, it is expressly contemplated that any storage operating system, including a write in-place file system, may be enhanced for use in accordance with the inventive principles described herein. As such, where the term "ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP® storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
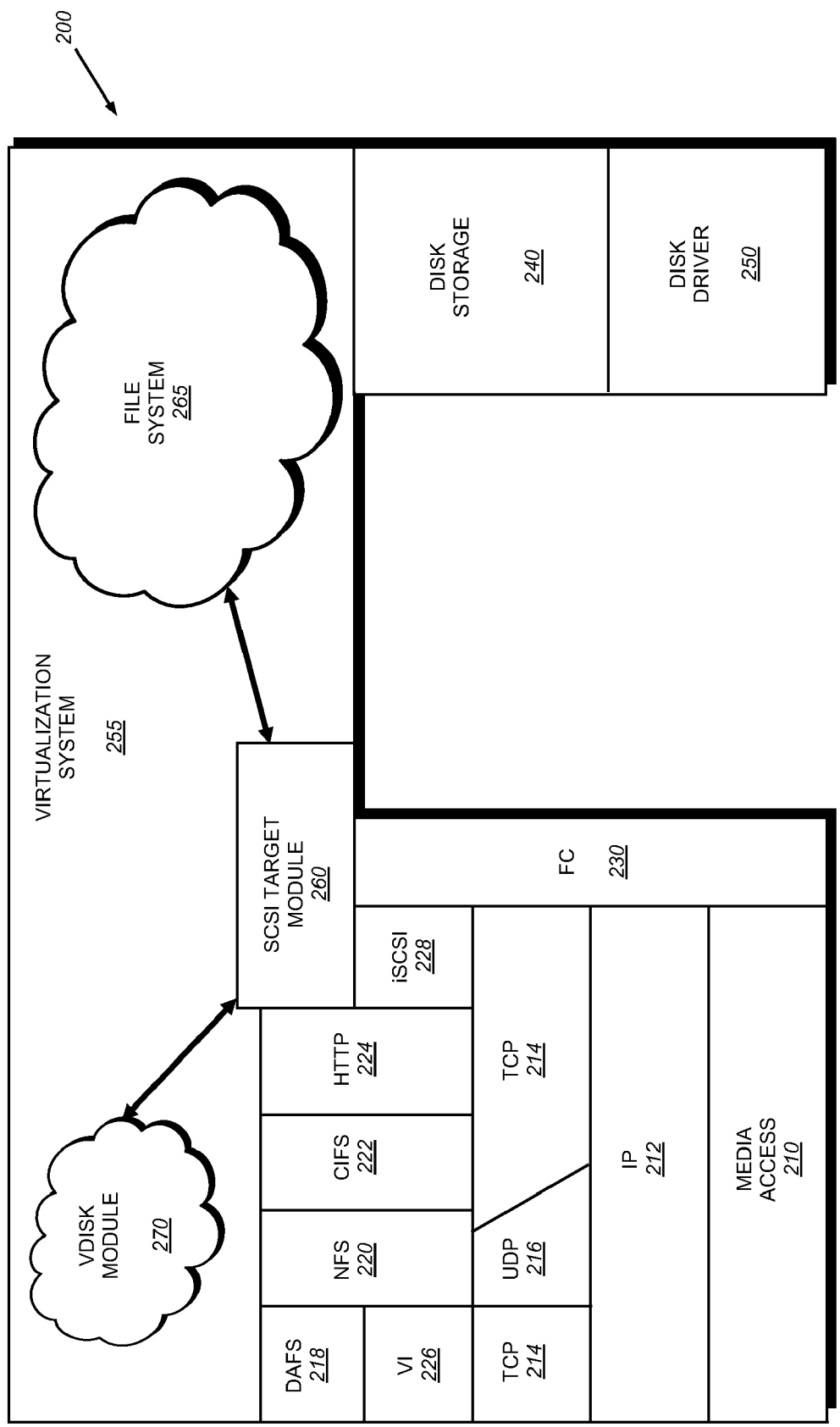
FIG. 2 is a schematic block diagram of an exemplary storage operating system for use on the storage system of FIG. 1 in accordance with an illustrative embodiment of the present invention.

FIG. 2 is a schematic block diagram of the storage operating system 200 that may be advantageously used with the present invention. The storage operating system comprises a series of software modules and/or engines organized to form an integrated network protocol stack or, more generally, a multi-protocol engine that provides data paths for clients to access information stored on the multi-protocol storage system using block and file access protocols. The protocol stack includes a media access module 210 of network drivers (e.g., gigabit Ethernet drivers) that interfaces to network protocol module, such as the IP module 212 and its supporting transport mechanisms, the TCP module 214 and the User Datagram Protocol (UDP) module 216. A file system protocol module provides multi-protocol file access and, to that end, includes support for the DAFS protocol 218, the NFS protocol 220, the CIFS protocol 222 and the Hypertext Transfer Protocol (HTTP) protocol 224. A VI module 226 implements the VI architecture to provide direct access transport (DAT) capabilities, such as RDMA, as required by the DAFS protocol 218.

An iSCSI driver module 228 provides block protocol access over the TCP/IP network protocol layers, while a FC driver module 230 operates with the network adapter to receive and transmit block access requests and responses to and from the storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage system. In addition, the storage operating system includes a disk storage module 240, such as a RAID system, that implements a disk storage protocol, such as a RAID protocol, and a disk driver module 250 that implements a disk access protocol such as, e.g., a SCSI protocol.

In the illustrative embodiment of the present invention, the disk storage module (e.g., RAID system 240) implements the novel nP technique. Illustratively, during write operations, the RAID system 240 encodes data according to an encoding technique described below and, in response to the detection of one or more failures of storage devices, reconstructs the data as described further below. It should be noted that in alternate embodiments, the novel nP technique may be implemented by modules of the storage operating system other than the RAID system 240. As such, the description of the RAID system 240 implementing the novel nP technique should be taken as exemplary only.

Bridging the disk software modules with the integrated network protocol stack layers is a virtualization system 255 that is implemented by a file system 265 interacting with virtualization modules illustratively embodied as, e.g., vdisk module 270 and SCSI target module 260. It should be noted that the vdisk module 270, the file system 265 and SCSI target module 260 can be implemented in software, hardware, firmware, or a combination thereof. The vdisk module 270 interacts with the file system 265 to enable access by administrative interfaces in response to a system administrator issuing commands to the multi-protocol storage system 120. In essence, the vdisk module 270 manages SAN deployments by, among other things, implementing a comprehensive set of vdisk (lun) commands issued through a user interface by a system administrator. These vdisk commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates luns into the special vdisk file types. The SCSI target module is illustratively disposed between the FC and iSCSI drivers 230, 228 and the file system 265 to thereby provide a translation layer of the virtualization system 255 between the SAN block (lun) space and the file system space, where luns are represented as vdisks. By "disposing" SAN virtualization over the file system 265, the multi-protocol storage system reverses the approaches taken by prior systems to thereby provide a single unified storage platform for essentially all storage access protocols.

The file system 265 is illustratively a message-based system; as such, the SCSI target module 260 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 260 passes the message into the file system 265 as, e.g., a function call, where the operation is performed.

The file system 265 illustratively implements the WAFL file system having an on-disk format representation that is block-based using, e.g., 4 kilobyte (KB) blocks and using modes to describe the files. The WAFL file system uses files to store metadata describing the layout of its file system; these metadata files include, among others, an mode file. A file handle, i.e., an identifier that includes an mode number, is used to retrieve an mode from disk.

Operationally, a request from the client 110 is forwarded as a packet over the computer network 105 and onto the storage system 120 where it is received at the network adapter 125. A network driver processes the packet and, if appropriate, passes it on to a network protocol and file access module for additional processing prior to forwarding to the write-anywhere file system 265. Here, the file system generates operations to load (retrieve) the requested data from disk 150 if it is not resident "in-core," i.e., in the memory 124. If the information is not in the memory, the file system 265 indexes into the mode file using the mode number to access an appropriate entry and retrieve a logical volume block number (vbn). The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 150 and loads the requested data block(s) in memory for processing by the storage system. Upon completion of the request, the storage system (and operating system) returns a reply to the client 110 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapter 125, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described is herein.

In addition, it will be understood to those skilled in the art that the inventive technique described herein may apply to any type of special-purpose (e.g., file server, filer or storage system) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Parity Encoding

The present invention provides an n-way parity protection technique that enables recovery of up to n disk (or other storage device) failures in a parity group of a storage array encoded to protect against n-way disk failures. The array is configured so that, in the event of failures of storage devices of the array, the contents of the array may be reconstructed using any technique for solving systems of linear equations. The storage array is created by first configuring the array with m data disks, where m=p−1 and p is a prime number. Row parity may be stored on a dedicated row parity disk, e.g., in a manner similar to RAID 4, or may be stored and rotated among the data disks, e.g., in a manner similar to RAID 5.

n−1 diagonal parity disks are then added to the array to provide a total of n bits of parity, i.e., 1 row parity bit and n−1 diagonal parity bits. Each diagonal parity set (i.e., diagonal) is associated with a slope that defines the data and row parity blocks of the array that are included in the diagonal. All diagonals having a common slope within a parity group are organized as a diagonal parity class. For each diagonal parity class, a diagonal parity storage disk is provided to store the diagonal parity. The number of added diagonal parity disks may be set by the administrator to achieve a desired level of protection provided that the maximum number of diagonal parity classes is limited to p−1. In other words, in accordance with an illustrative embodiment described herein, n≦p, because the number of n−1 diagonal parity classes cannot exceed p−1. Once added to the array, each diagonal parity disk is divided into blocks, and the blocks of the data disks and, if applicable, the row parity disk are organized into stripes. The row parity is then computed by XORing data blocks of a row parity set (i.e., row) and the computed parity is then stored in row parity blocks on the row parity disk or the appropriate data disk.

All data and row parity blocks are then assigned to diagonals of the n−1 diagonal parity classes. One of the diagonal parity classes is selected and the diagonal parity for each diagonal of the class, i.e., diagonals having a common slope, is computed. The computed diagonal parity is then stored on the appropriate diagonal parity disk. If there are additional diagonal parity classes, the process repeats for each additional class.

Figure 3:
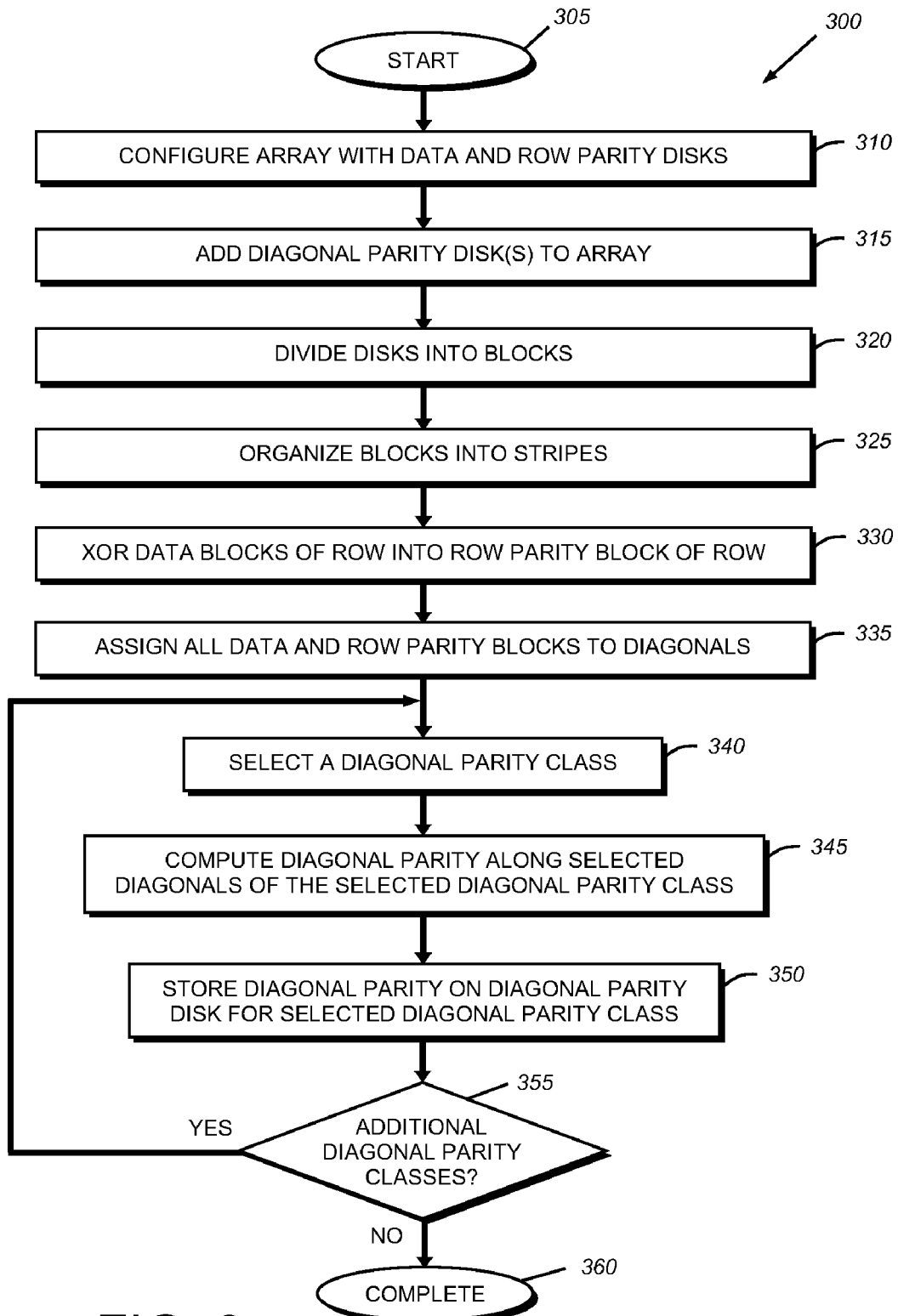
FIG. 3 is a flowchart detailing the steps of a procedure for encoding parity in accordance with an illustrative embodiment of the present invention.

FIG. 3 is a flowchart illustrating the steps of a procedure 300 for implementing an n-way parity technique in accordance with an illustrative embodiment of the present invention. The procedure 300 starts in step 305 and proceeds to step 310 where an array is initially configured with a number of storage devices, such as disks, equal to a number m, where m=p−1 with p being a prime number. The m disks represent the data disks within the array. The array may be configured manually by, e.g., an administrator or may be automatically configured by a software agent, such as the disk storage module 240 of the storage operating system, executing on a storage system 120. In step 315, additional parity disks are added such that the entire array consists of up to m+n disks. Illustratively, these disks may be added manually or by a software agent, e.g., disk storage module 240. At this point, the array comprises p−1 data disks, one row parity disk and up to n−1 diagonal parity disks. Illustratively, for each diagonal parity class, a diagonal parity disk is provided to store the diagonal parity for that diagonal parity class. However, as discussed further below, it is not required that the maximum number of diagonal parity classes be utilized when an array is configured. In accordance with the teachings of the present invention, the array may be configured to support detection of the failures of n devices while being able to support correction (i.e., reconstruction) of the data contained on those failed devices. In accordance with an illustrative embodiment of the present invention, n≦p, because the number of diagonal parity classes cannot exceed p−1.

In step 320, the disks are divided into blocks by, e.g., the disk storage module 240 and, in step 325, the blocks are organized into stripes. In step 330, the disk storage module 240 then XORs each data block of a row into a row parity block of the row containing the XOR of all data blocks at the same position on each data disk. This is illustratively performed in a manner similar to conventional RAID 4 row parity encoding. It should be noted that in alternative embodiments, the location of the row parity may move, similar to a RAID 5 arrangement. As such, the description of a RAID 4 encoding technique should be taken as exemplary only.

All of the data blocks and the row parity blocks are then assigned by, e.g., the disk storage module 240, to diagonals of the diagonal parity classes in step 335. As noted above, a separate diagonal parity storage device is provided for each diagonal parity class to store the corresponding diagonal parity of the diagonals within that class. It should be noted that in an illustrative embodiment of the present invention, there are three or more diagonal parity classes with varying slopes. However, in alternative embodiments, any positive integer number (up to n−1) of diagonal parity classes may be utilized. In the above-incorporated U.S. patent application Ser. No. 11/304,369, arrays may be configured with each diagonal having a specific slope value, e.g., a diagonal of slope +1, and an anti-diagonal having an inverse slope of the diagonal, e.g., an anti-diagonal of slope −1. Illustratively, the present invention improves on the technique of the above-incorporated application by enabling arrays to be configured with diagonals having any integer value slope and not requiring an anti-diagonal having the inverse slope of a diagonal. As described above, the incorporated application describes a technique where arrays may be configured with each diagonal having a specific slope value, e.g., a diagonal of slope +1, and an anti-diagonal having an inverse slope of the diagonal, e.g., an anti-diagonal of slope −1. Thus, for example, the present invention enables an administrator to configure a triple (i.e., n=3) parity array with diagonals of diagonal parity classes having, eg., slope +1 and +2.

Illustratively, each member of the array of data blocks and row parity blocks may be indexed to their assigned position by A[i,j] where i represents the row index and j represents the column index and A[ ] represents the array. Illustratively, each of these index values may range from 0 to p−1.

Using this representation of a two dimensional array, diagonal number x having a slope s may be defined by:

$$A[(x+s*j) \bmod p, j] \text{ where } j=\{0 \ldots p-1\}$$

The term slope may be understood in a conventional geometric sense, i.e., the ratio of number of locations moved up/down divided by the number of locations moved left/right. For example, a slope of +2 would represent a diagonal in which the next location is two locations down and one to the right, a slope of −4 would represent a diagonal in which the next location is four up and one to the right, etc. Illustratively, the n-way parity is implemented by the disk storage module 240. However, herein may be implemented in other modules or may be distributed among a plurality of modules.

FIG. 4 is a schematic block diagram of an exemplary striping arrangement in accordance with an illustrative embodiment of the present invention. The arrangement is of an exemplary array wherein p=7 and s=+2. It should be noted that only the data disk and row parity disks are shown as the diagonal parity disks are not included in other diagonals. Each of the numbers illustrated in the arrangement represents one or more blocks that are assigned to a given diagonal. Thus, each of the 0's within FIG. 4 represents one or more blocks that exist on diagonal 0 having a slope of +2, etc. Diagonals are numbered from 0 to p−1, so that in this example, they are numbered from 0 to 6. Each of the diagonals depicted in illustrative FIG. 4 has the same slope (i.e., +2) and is therefore part of the same diagonal parity class whose diagonal parity is stored on a single diagonal parity storage device. As will be appreciated from FIG. 4, diagonals wrap around the edges of the array to ensure that all data and row parity blocks of the array are covered by at least one diagonal. The last row (row p−1) is assumed to contain a predefined value, e.g., 0. This is indicated in FIG. 4 by the last row being in dashed lines. Having a row with a predefined value enables the diagonals to span (i.e., cover) the entirety of the data and row parity blocks and further ensures that there is one known value in each diagonal. This aids in reconstruction as it removes a potential variable from the system of equations to be solved. The exemplary striping arrangement of FIG. 4 may be represented by A[(x+2*j) mod 7, j], where j ranges from 0 to p−1.

FIG. 5 is a schematic block diagram of an exemplary striping arrangement in accordance with an illustrative embodiment of the present invention. The arrangement is of an exemplary array wherein p=7 and s=−3. Similar to FIG. 4 only the data disk and row parity disks are shown as the diagonal parity disks are not included in other diagonals. The exemplary striping arrangement of FIG. 5 may be represented by A[(x−3*j) mod 7, j]. The exemplary striping arrangements of FIGS. 4 and 5 may be utilized with an n=3 array. In such an exemplary array, the three parity bits would be provided by: (a) row parity, (b) diagonal parity of diagonals within the diagonal parity class having a slope +2 as shown in FIG. 4 and (c) diagonal parity of diagonals within the diagonal parity class having slope −3 as shown in FIG. 5. As will be appreciated, such an arrangement could have additional diagonal parity classes (with corresponding additional diagonal parity/bits) to increase the parity protection; however, illustrative embodiments of the present invention do not require that the maximum number of diagonal parity classes be utilized. A further noted advantage of the present invention is that additional diagonal parity classes may be added to an array without requiring all parity to be recomputed. That is, assuming that the array has not already been configured with the maximum number of diagonal parity classes, a new diagonal parity storage device may be added to the array by adding a diagonal parity storage device to store the parity for the new diagonal parity class. In such a case, the only parity needed to be computed is the diagonal parity to be stored on the newly added storage device. This provides the ability for an administrator to increase the level of protection of an array after the array has already been placed in service without requiring the time consuming and resource intensive re-computation of all parity within the array. It should be noted that while the number of data disks must satisfy the condition that m=p−1, where p is prime, it is possible to construct an array with fewer data disks. The additional disks, i.e., those disks between the physical number of disks and m, may be imaginary zero filled disks to satisfy the m=p−1 condition. The imaginary zero filled disks do not affect parity calculations. Additionally, slopes of the diagonal parity classes must be chosen in a manner such that they are different module the prime number p used to construct the array. For example, if the prime p=7, then slopes 1, 2 and −3 satisfy this condition. However, slopes 4 and −3 do not as −3 mod 7=(7−3) mod 7=4 mod 7.

Referring again to FIG. 3, once all of the data and row parity blocks have been assigned to diagonals, one of the diagonal parity classes is selected by, e.g., the disk storage module 240, in step 340. The diagonal parity along the diagonals within the selected diagonal parity class is computed by, e.g., performing an XOR operation of all of the blocks along those diagonals within the diagonal parity class. The computed diagonal parity blocks are then stored on diagonal parity disk associated with the selected diagonal parity class in step 350. This storage may be performed by, e.g., the disk storage module 240 working in conjunction with the disk driver 250 to cause the computed parity to be stored on disks 150. A determination is made in step 355 whether diagonal parity for any additional diagonal parity classes need to be computed. Should diagonal parity for additional diagonal parity classes need to be computed, the procedure 300 loops back to step 340 and selects another diagonal parity class. The procedure 300 then completes at step 360. As a result of procedure 300, the array is configured to enable recovery from the failure of n storage devices (e.g., disks) within the array. The array can thereafter be reconstructed (e.g., in response to an error condition) using any technique for solving systems of linear equations.

Figure 6:
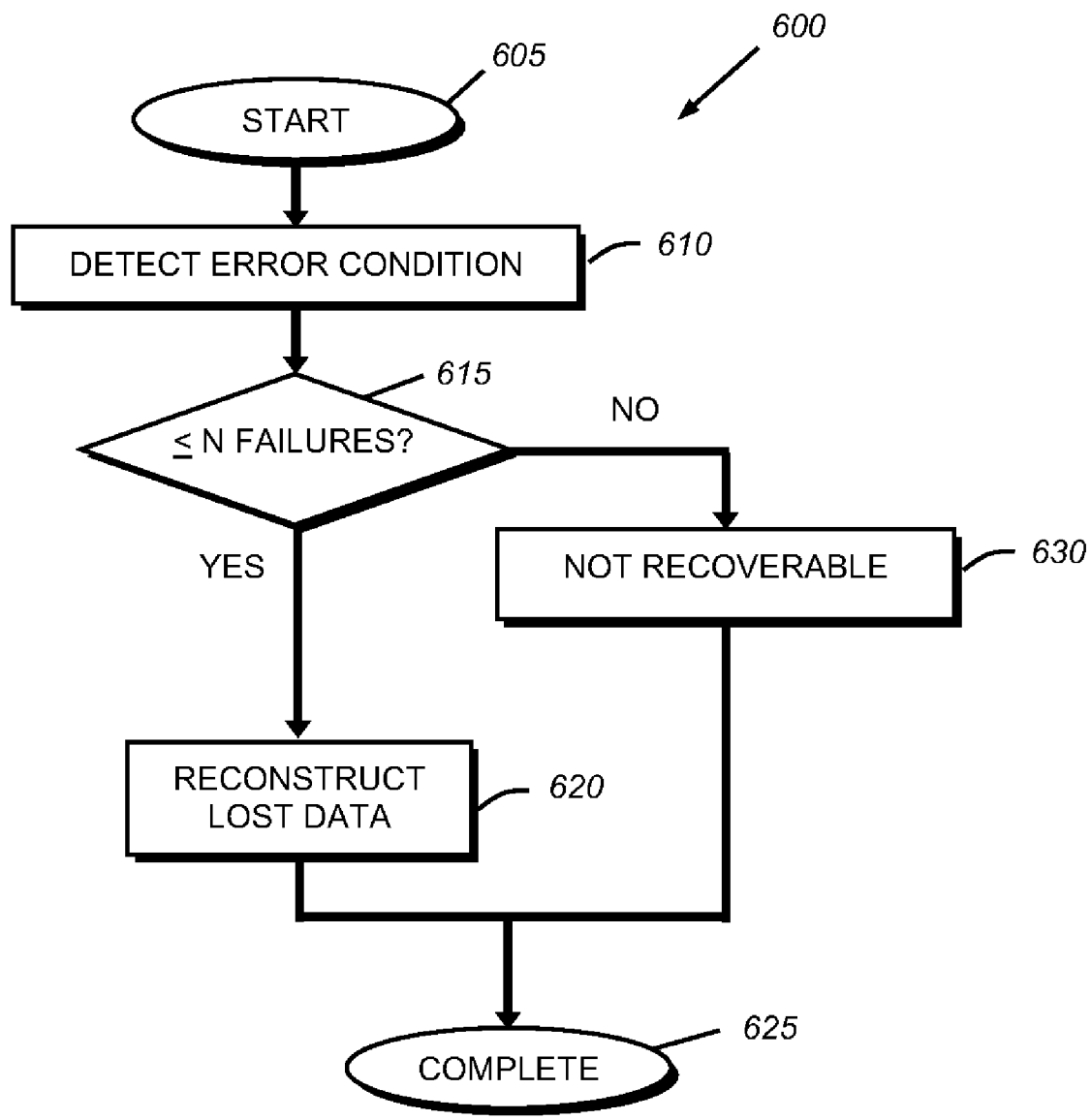
FIG. 6 is a flowchart detailing the steps of a procedure for recovering from one or more disk failures in accordance with an illustrative embodiment of the present invention.

FIG. 6 is a flowchart illustrating the steps of an exemplary procedure 600 for performing reconstruction in the event of one or more failed storage devices in accordance with an illustrative embodiment of the present invention. The procedure 600 begins in step 605 and continues to step 610 where an error condition is detected by, e.g., the disk storage module 240. The error condition may comprise, e.g., failure of one or more storage devices. Failure may occur due to, e.g., physical damage to the media, loss of connectivity, etc. The error may be detected by conventional error detection techniques such as, e.g., input/output (I/O) failures to the device, detection of loss of connectivity, etc. The disk storage module 240 then, in step 615, determines whether the number of failures is less than or equal to n. If the number of failures is less than or equal to n, then the failures can be corrected using the nP technique described herein. In that case, the procedure continues to step 620 where the lost data is reconstructed. As noted above, any technique for solving a system of linear equations may be utilized to perform the reconstruction of the nP array. Illustrative techniques for solving a system of linear equations include, e.g., Gaussian Elimination, Cramer's Rule, Cholesky Decomposition, LU Decomposition. Another exemplary technique is described in Matrix Methods for Lost Data Reconstruction in Erasure Codes, by James Lee Hafner, et al, FAST '05: 4$^{th}$ USENIX Conference on File and Storage Technologies, the contents of which are hereby incorporated by reference. Once the data has been reconstructed, the procedure 600 then completes in step 625.

If it is determined, in step 615, that the number of failures is greater than n, then the procedure 600 branches to step 630 where the error condition is deemed as not recoverable before the procedure completes in step 625.

The foregoing description has been directed to specific embodiments of this invention. It will be apparent, however, that other variations and modifications may be made to the described embodiments, with the attainment of some or all of their advantages. For example, while the description is written in terms of disks, any storage devices including, but not limited to, flash devices and other solid state media may be utilized in accordance with alternative embodiments. Therefore, it is the object of the appended claims to cover all such variations and modifications as come within the true spirit and scope of the invention.

The invention claimed is:

1. A method for enabling recovery from up to n concurrent failures of storage devices in a storage array, comprising:
    providing the array with a predetermined number of storage devices, including a plurality of first devices configured to store data and row parity, wherein the predetermined number of storage devices m is less than or equal to p−1 and wherein p is a prime number;
    providing the array with at least three second devices configured to store at least three diagonal parity classes;
    dividing each device into blocks;
    organizing the blocks into stripes that contain blocks in each device;
    computing a row parity for each row of data;
    assigning all blocks from the devices storing data and row parity to diagonals; and
    for each diagonal parity class, computing diagonal parity along all diagonals having a common slope and storing the computed diagonal parity on one of the second devices associated with the diagonal parity class.

2. The method of claim 1 wherein row parity blocks in a stripe are all stored on a single device.

3. The method of claim 1 wherein the first devices include a plurality of data devices, and wherein the data devices are not all present and absent data devices are treated as containing all zeroes for calculating parity.

4. The method of claim 1 wherein locations of parity blocks shift from device to device within different stripes.

5. The method of claim 1 wherein the stripes are a power of two number of bits in size.

6. The method of claim 1 wherein the plurality of second devices comprises up to n−1 devices and wherein n≦p.

7. The method of claim 1 wherein the first and second plurality of storage devices comprise disk drives.

8. The method of claim 1 further comprising, in response to detecting failure of one or more storage devices, performing a reconstruction technique on the non-failed storage devices.

9. The method of claim 1 further comprising:
    adding an additional second device to store an additional diagonal parity class wherein only the diagonal parity along all diagonals having a common slope with the additional diagonal parity class is computed; and
    storing the computed diagonal parity on the additional second device associated with the additional diagonal parity class.

10. The method of claim 1 wherein the slope comprises a ratio of a number of storage devices over and up between two adjacent storage devices in a diagonal.

11. The method of claim 1 wherein the common slope comprises slopes being equal in value.

12. The method of claim 1 wherein the storage devices comprise flash devices.

13. A system to enable recovery from up to n concurrent failures of storage devices in a storage array, comprising:
    the storage array configured with a predetermined number of storage devices, including a plurality of first devices configured to store data and row parity, and a plurality of second devices configured to store diagonal parity, wherein the predetermined number of storage devices m is p−1 and wherein p is a prime number, wherein each device is divided into blocks and the blocks are organized into stripes that contain a same number of blocks in each device;

the storage array further configured with at least three second devices configured to store diagonal parity classes, each diagonal parity class defined by a slope along the data and row parity; and a storage operating system including a device storage module configured to compute and store diagonal parity for all of the diagonal parity classes.

14. The system of claim 13, wherein row parity blocks in a stripe are all stored on a single device.

15. The system of claim 13, wherein the device storage module layer is a RAID system and wherein the storage devices are disks.

16. The system of claim 13, wherein the devices are one of video tape, magnetic tape, optical, DVD, bubble memory, magnetic disk, electronic random access memory and micro-electro mechanical storage devices.

17. The system of claim 13, wherein the first devices include a plurality of data devices, and wherein the data devices are not all present and absent data devices are treated as containing all zeroes for calculating parity.

18. The system of claim 13, wherein row parity blocks are rotated through a plurality of devices in a stripe.

19. The system of claim 13, wherein the device storing row parity, diagonal parity, or data varies from stripe to stripe.

20. The system of claim 13 wherein a number of distinct slopes utilized is at most p−1.

21. The system of claim 13 wherein the device storage module is further configured to reconstruct data from a plurality of failures of the first or second plurality of devices.

22. The system of claim 13 wherein the storage devices are flash devices.

23. A method for enabling recovery from up to n concurrent failures of storage devices in a storage array, comprising:

associating a set of slopes with the storage array, each slope associated with a diagonal parity class of a set of data and row parity devices within the storage array, wherein no two slopes are equal modulo a prime number associated with the storage array;

determining, by a storage module of a storage operating system executing on a storage system, row parity for each row of data within the storage array and storing the determined row parity on the set of row parity devices; and determining, for each diagonal parity class, a set of diagonal parity that spans the data and row parity devices and storing the determined diagonal parity on a diagonal parity device associated with the diagonal parity class within the storage array.

24. The method of claim 23 wherein the storage devices comprise disk drives.

25. The method of claim 23 wherein the set of data and row parity devices comprise p devices, wherein p is a prime number and wherein the set of diagonal parity devices comprises n−1 devices.

* * * * *

UNITED STATES PATENT AND TRADEMARK OFFICE
CERTIFICATE OF CORRECTION

PATENT NO. : 8,402,346 B2
APPLICATION NO. : 12/536063
DATED : March 19, 2013
INVENTOR(S) : Atul Goel et al.

Page 1 of 1

It is certified that error appears in the above-identified patent and that said Letters Patent is hereby corrected as shown below:

In col. 8, line 66 should read:
~~Modes~~ inodes to describe the files. The WAFL file system uses files In col. 9, line 1 should read:
metadata files include, among others, an ~~mode~~ inode file. A file In col. 9, line 2 should read:
handle, i.e., an identifier that includes an ~~mode~~ inode number, is In col. 9, line 3 should read:
used to retrieve an ~~mode~~ inode from disk.

In col. 9, line 14 should read:
the ~~mode~~ inode file using the ~~mode~~ inode number to access an appropriate In col. 9, line 56 should read:
for storage applications as described ~~is~~ herein.

Signed and Sealed this
Eighteenth Day of June, 2013

Teresa Stanek Rea
*Acting Director of the United States Patent and Trademark Office*